United States Patent [19]

Ciuci

[11] 4,054,313
[45] Oct. 18, 1977

[54] FOLDABLE SAND TRAP SMOOTHER

[76] Inventor: Richard W. Ciuci, 3 Marseilles Drive, Lattingtown, Locust Valley, N.Y. 11560

[21] Appl. No.: 722,044

[22] Filed: Sept. 10, 1976

Related U.S. Application Data

[63] Continuation-in-part of Ser. No. 626,090, Oct. 28, 1975, abandoned.

[51] Int. Cl.² ............................................. A01D 7/00
[52] U.S. Cl. ................................. 294/53.5; 294/50.8; 56/400.19; 56/400.21
[58] Field of Search ...................... 294/50.6, 50.8, 51, 294/52, 53.5, 57; 56/400.19, 400.20, 400.21

[56] References Cited
U.S. PATENT DOCUMENTS 1,239,735  9/1917  Smith et al. .................... 56/400.21
1,740,286  12/1929  Dabrowski .................... 56/400.19

FOREIGN PATENT DOCUMENTS 58,935  8/1941  Denmark ........................ 56/400.19

Primary Examiner—James B. Marbert
Attorney, Agent, or Firm—Kane, Dalsimer, Kane, Sullivan, and Kurucz

[57] ABSTRACT

A sand trap smoother for use in smoothing the surface of sand in a trap on a golf course, which has an open position in which two blade members having unique teeth are extended to form a sand smoothing plow and a closed position in which the blades are collapsed adjacent the shaft handle for storage within a golf bag.

4 Claims, 6 Drawing Figures

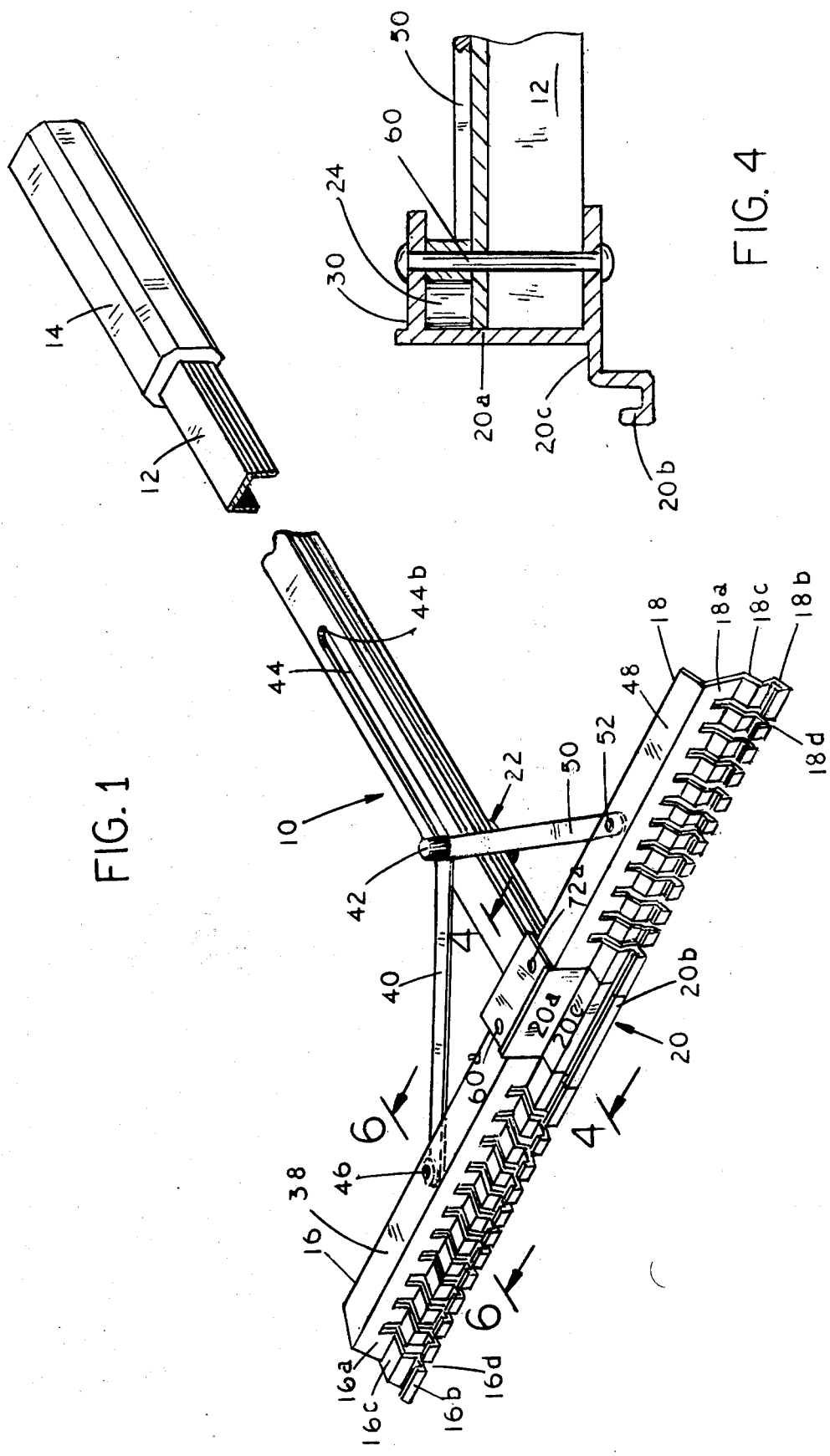

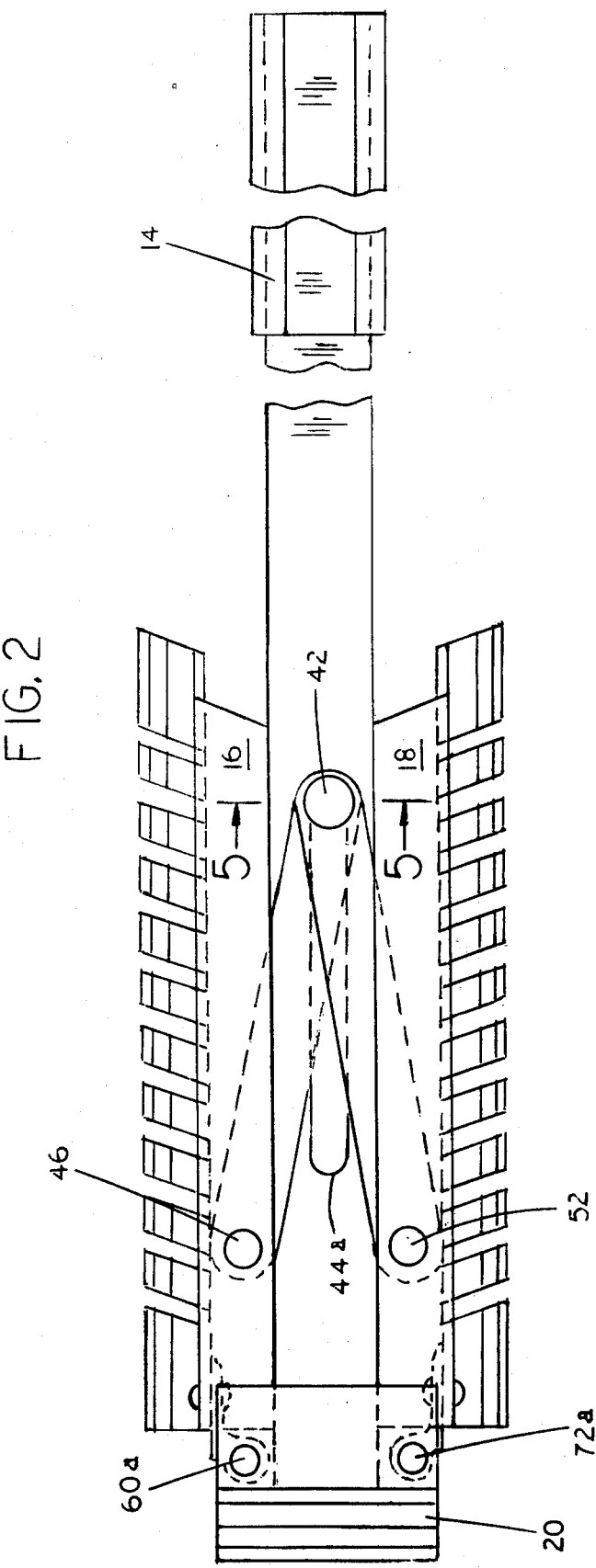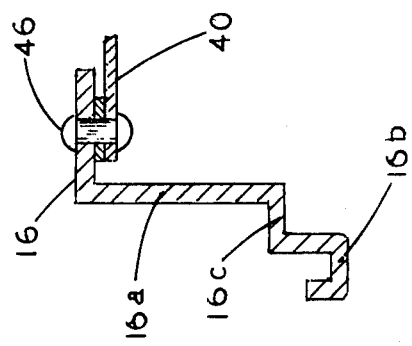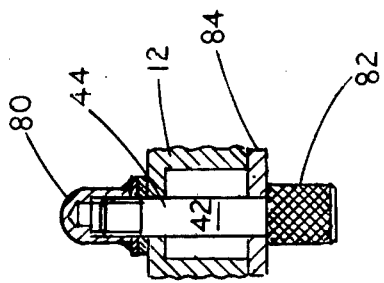

FOLDABLE SAND TRAP SMOOTHER

CROSS-REFERENCE TO RELATED APPLICATION

This application is a continuation-in-part of my pending application Ser. No. 626,090 entitled "Foldable Sand Trap Smoother" filed Oct. 28, 1975 now abandoned.

BACKGROUND OF THE INVENTION

The designer of a golf course in laying out the course specifically selects locations on the course to place sand traps or sand hazards. This is not done routinely or haphazardly but rather the selection of the location of each sand trap is based upon experience and knowledge of the designer in providing these hazards and forming and locating the particular sand trap in an intelligent and logical way. As part of this procedure it is contemplated by the designer that the degree of difficulty involved in the player hitting the ball out of the trap will be determined by factors other than the surface smoothness of the sand.. Accordingly it is assumed by the designer that the surface of the sand and the trap will be smooth as the golfer approaches the hazard and interrupted only by the impact of the golfer or of his ball in the sand. Because of this requirement heretofore rakes have been utilized to smooth the surface of the sand in the trap and at golf courses, private and public, rakes have been provided in the vicinity of the trap. Theft of rakes so provided has become a problem in that rakes so placed have been taken from both private and public courses and accordingly it is not infrequent to find a trap that has not been smoothed or for the golfer to be unable to find a rake when he desires to smooth the trap after coming out of the same.

SUMMARY OF THE INVENTION

A sand trap smoother including a rod, handle and two elongated blades pivotally attached thereto at one end, said blades being extendable to form a sand smoothing plow and being collapsible or foldable about the rod handle for storage within a golf bag.

DESCRIPTION OF THE DRAWINGS

FIG. 1 is a perspective view of a sand trap smoother constructed in accordance with the teachings of this invention in which the blades are shown in the extended position;

FIG. 2 is a top view of the sand trap smoother which is shown in FIG. 1 with the blades in folded position;

FIG. 4 is a sectional view taken along the line 4—4 in the direction of the arrows in FIG. 1; and FIG. 5 is a transverse sectional view taken along the line 5—5 in the direction of the arrows in FIG. 2; and FIG. 6 is a transverse sectional view taken along the line 6—6 in the direction of the arrows in FIG. 1.

DESCRIPTION OF THE PREFERRED EMBODIMENT

Figure 3:
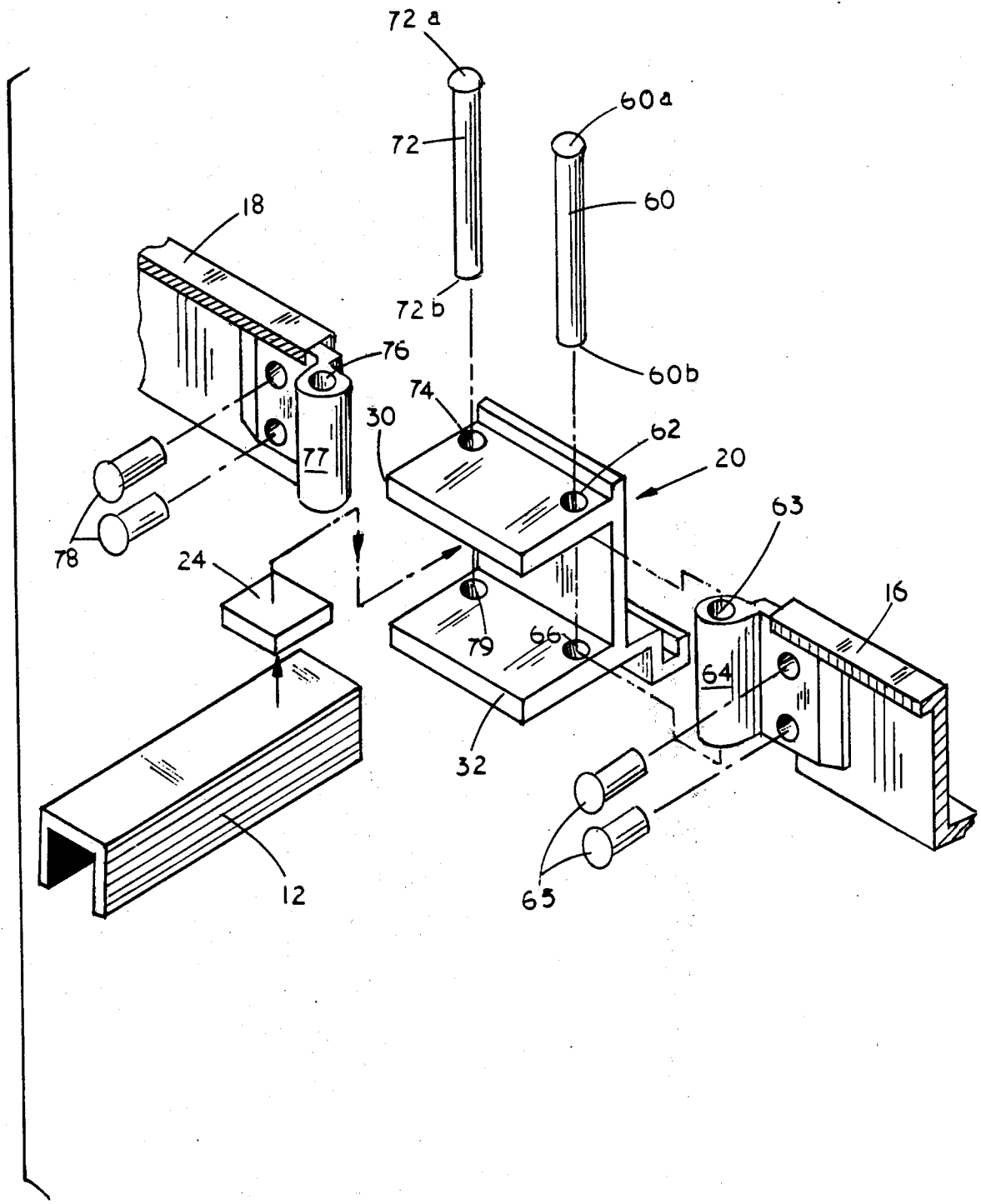
FIG. 3 is an exploded enlarged segmentary view showing the pivotal attachment of blades to rod handle.

A sand trap smoother constructed in accordance with the teachings of this invention is shown in the FIGS. and indicated therein by the numeral 10. The trap smoother 10 consists essentially of elongated U-shaped rod handle 12 with plastic handle grip 14 thereon, blade members 16 and 18 coupled thereto by nose bracket 20 and blade control member 22 provided for longitudinal movement along the blade handle to enable the blades to be moved between the open or extended position shown in FIG. 1 and the closed or collapsed position shown in FIG. 2.

The rod handle 12 as shown in FIG. 3 is connected at one end to the bracket 20 by means of block 24 to which it is welded and which in turn is welded to the undersurface of flange 30 with the rod end being sandwiched between flanges 30 and 32 which project rearwardly of bracket 20.

Blade member 16 has an upper rearwardly projecting surface 38 formed thereon to which is pivotally attached connecting rod 40 an end of which is pivotally attached to blade control member 22 at pin 42 which projects through slot 44 in rod handle 12. The connection of rod 40 and surface 38 is by pin 46. Likewise surface 48 of blade member 18 is pivotally attached to connecting rod 50 at pin 52 and to member 22 by the pin 42.

Stop means is provided by the ends 44a and 44b of slot 44 and the member 22 is shiftable between the position shown in FIG. 1 in which pin 42 abuts slot end 44a and which is the open or extended position, and a closed or folded position as shown in FIG. 2 wherein the blade control member 22 has been moved to the extreme right and pin 42 abuts slot end 44b.

The pivotal connection of blade member 16 to bracket 20 is best seen in FIG. 3 and accomplished through use of tubular rivet 60 which passes through opening 62 formed in nose bracket flange 30, opening 63 formed in post bracket 64 which is attached to blade member 18 by rivets 65 and opening 66 which is formed in nose bracket flange 32. The rivet head 60a and upset end 60b maintain the parts in position after assembly and allow relative pivotal movement between blade member 16 and nose bracket 20.

Blade 18 is attached in the same manner with rivet 72 passing through nose bracket opening 74, opening 76 formed in post bracket 77 attached to blade member 18 by rivets 78, and nose bracket opening 79.

Each of the blades is provided with a unique sand smoothing toothed surface. Blade 18 as seen in FIG. 1 is provided with a plurality of aligned teeth each of which has a vertical body portion 18a and a U-shaped forward portion 18b connected at the bottom thereof by horizontal connecting portion 18c. The teeth are separated by slots 18d which form an angle with the front vertical plane of the blade. Blade 16 is similarly constructed and in the FIGS. the numerals 16a, 16b and 16c respectively designate the vertical U-shaped and horizontal portions while the numeral 16d designates the slots between teeth.

Member 20 is similarly shaped, however without the teeth. The numeral 20a designates the vertical surface of member 20, the numeral 20b the U-shaped portion and numeral 20c the horizontal connecting portion.

As discussed above, the blades can be moved between the open and closed position. The closed or folded condition is for storage and/or carrying in a golf bag, while the open or extended position is for smoothing the surface of a sand trap. In the open position as seen in FIG. 1 the transverse dimension of member 20 is such that on either side it overlaps the innermost end of the adjacent blade 16 or 18 with the front portions of blades and nose bracket generally aligned.

The blade control member 22 projects through slot 44 with the threaded end of pin 42 engaging nut 80 which surrounds and encloses it. A knurled handle 82 is provided on pin 42 which is used to tighten or untighten the pin. When tightened washer 84 is sandwiched between knurled handle 82 and rake handle 22 as shown in FIG. 5.

In use the golfer or cadddy will withdraw the trap smoother from the golf bag and by use of member 22 shift the blades to the extended position and thereafter work the surface of the sand with the blades and member 20 until the same are smooth. The particular configuration of the lower portions of the blades and member 20 aid in this action and ensure a properly smooth sand surface.

The pastic handle 14 is provided to grip the shaft for operating.

I claim:

1. A sand trap smoother including in combination a shaft handle, first and second blade members pivotally attached to said shaft handle at one end thereof, a closed position of said blade members in which said blade members are folded substantially adjacent said shaft handle, an open position of said blade members in which said blade members are substantially aligned at right angles to said shaft handle, a longitudinal slot formed in said shaft handle, a blade control member disposed in said slot and telescopically movable therein relative to said shaft handle, first and second connecting rods pivotally attached to said first and second blade members respectively and to said blade control member, handle means attached to said blade control member whereby said blade members can be moved between said open and closed positions, said handle means including screw means for fastening said blade control member in position in said slot whereby said blade members are retained in fixed position.

2. A sand trap smoother in accordance with claim 1 in which bracket means are provided for connecting said blade members to said shaft handle and wherein said open position the transverse dimension of said bracket means is such that each of its slides overlaps the innermost end of a respective blade member.

3. A sand trap smoother in accordance with claim 2 in which said bracket means includes a vertical surface, a U-shaped portion and a horizontal connecting portion.

4. A sand trap smoother in accordance with claim 1 in which each of said blade members has a plurality of aligned teeth each of which has a vertical body portion and a U-shaped forward portion connected at the bottom thereof by a horizontal connecting portion, said teeth being separated by slots which form an angle with the front vertical plane of the blade member.

* * * * *